July 26, 1927. 1,637,141
H. COOPER
FLEXIBLE TUBING
Filed Aug. 9, 1922  2 Sheets-Sheet 1
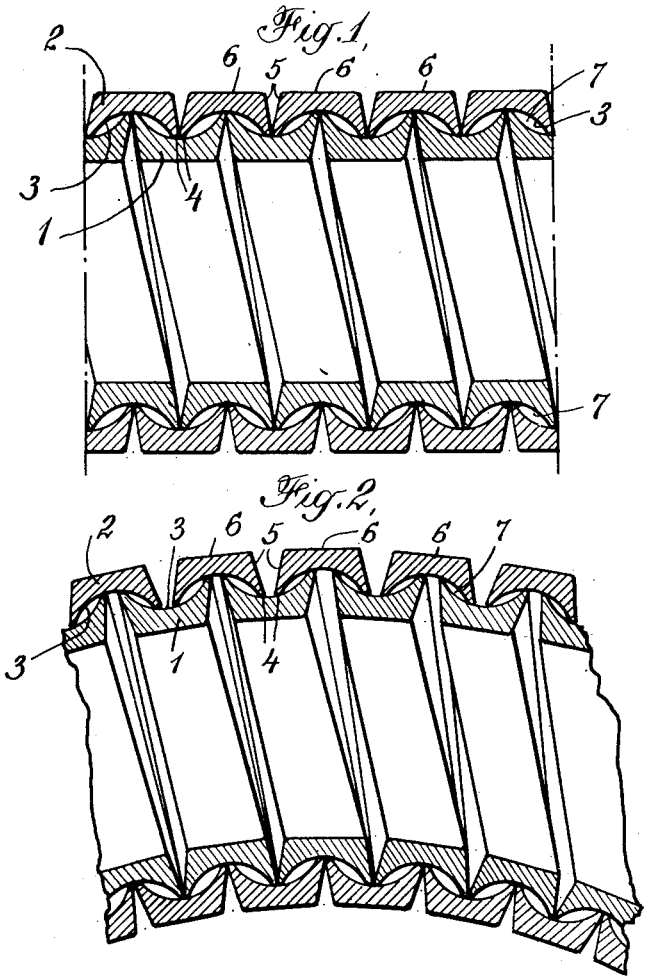
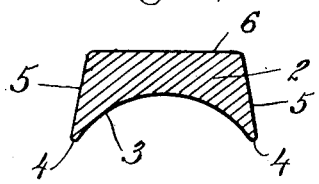
Herbert Cooper, INVENTOR
BY Walter J. Gill, ATTORNEY

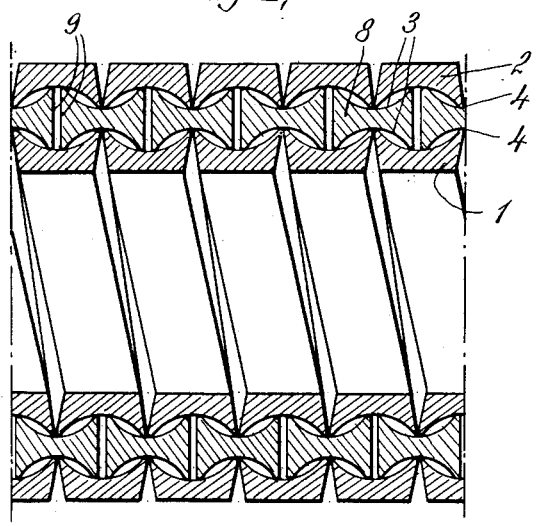
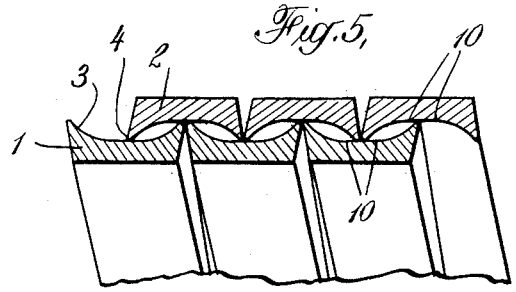
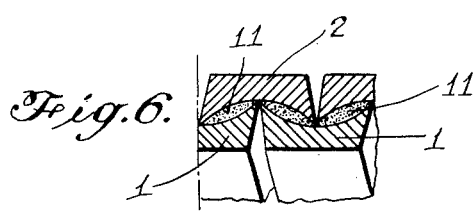

Patented July 26, 1927.

1,637,141

UNITED STATES PATENT OFFICE.

HERBERT COOPER, OF BROOKLYN, NEW YORK.

FLEXIBLE TUBING.

Application filed August 9, 1922. Serial No. 580,629.

This invention relates to flexible tubing particularly adapted for conveying fluids, encasing flexible shafting or other purposes for which tubing of this kind is required.

Flexible tubing has a wide range of usefulness, and on account of the disadvantages of rubber due to its tendency to deteriorate and its lack of resistance to some kinds of fluids, the use of tubing composed in whole or in part of this material is limited to cases in which these characteristics are not objectionable. In an attempt to overcome the disadvantages of tubing having rubber as its principal constituent, various kinds of tubing have been produced, either composed entirely of metal, usually in the form of coils, or of a combination of metal and some resilient material which is intended to act as a packing for the coils of metal, which give the tubing its strength and shape.

Flexible tubing to be of any value for its intended purposes should be strong and tight under all conditions, especially when it is to be used for conveying gases or volatile and inflammable liquids, such as gasoline. Many of the types of flexible tubing in use at the present time fail to meet one or the other or even both of these requirements in a satisfactory manner. Some of them possess the disadvantage of opening between the turns of their coils upon longitudinal strain. Other kinds composed of interlocked coils possess a tendency to uncoil if the coils are not permanently united to each other at the ends of the tubing, as by means of terminal members which are usually used for connecting the tubing to the receptacles or other devices between which a fluid is to be conveyed. Even in the last named types the number of coils which it has been possible to use is, so far as I am aware, limited to two, so that the increased strength, tightness and other advantages which might be obtained by the use of additional coils have been impossible to attain.

The present invention has for its principal objects the provision of flexible tubing composed of metal, which shall be strong and tight for fluids of all kinds, will not have any tendency to uncoil nor open under longitudinal strains, although if desired it may be constructed to yield, in the manner of a spring, to such strains, which may be cheaply and rapidly manufactured by a simple winding operation and which is also particularly adapted for use as a sheathing or casing for flexible shafting.

In accordance with the invention, the tubing consists of two or more coacting coils of suitable wire, such as hard drawn or rolled steel. The opposed faces of the coils are provided with channels, preferably of arcuate cross section and substantially the same width. The coils are so related that the edges of the channel of each turn of each coil lie in contact with the central portion of the channel of two adjacent turns of an adjoining coil, and, at least so far as the coils forming the interior and exterior of the tubing are concerned, the edges of the channel of each turn also lie in contact with the same parts of contiguous turns of the same coil, when the tubing is straight.

All of the coils are pressed firmly against each other by the spring tension of the metal of which they are composed, the amount of pressure being determined by the relative diameters to which the coils are wound during the operation of forming the tubing, which may be performed by a suitable machine adapted to wind the wires into coils coacting with each other as described.

The structure of the tubing permits it to be bent without danger of leakage, for while there will be a slight separation of the adjacent edges of the turns of the coils, which increases from the concave to the convex side of the bend, there will be a corresponding movement of the edges along the arcuate surfaces with which they are in contact, thus binding the coils even more tightly together to make up for the separation between the edges of their turns. The sides of the wires forming the innermost and outermost coils are bevelled slightly to permit the tubing to be bent, for otherwise the sides of adjacent turns of these coils would abut and prevent flexibility.

The particular nature of the invention as well as other objects and advantages thereof will appear more clearly from a description of certain preferred embodiments thereof as illustrated in the accompanying drawing in which Fig. 1 is a longitudinal sectional view of a piece of two-coil tubing in straight condition, Fig. 2 is a similar view showing the tubing in bent condition, Fig. 3 is a cross sectional view on an enlarged scale of the wire of which the tubing is composed, Fig. 4 is a longitudinal sectional view of a piece of tubing formed of three coils, and Fig. 5 is a similar view of a portion of tubing constructed to permit longitudinal extension, Fig. 6 is a fragmentary view of tubing provided with packing between its coils.

The tubing shown in Figs. 1 and 2 consists of inner and outer coils 1 and 2 each preferably formed of steel wire which may be hard drawn or rolled into the shape shown consisting of a channel 3 preferably of arcuate cross section and having rounded edges 4. The sides 5 of the wire are bevelled and the face 6 opposite the channel is flat, although it may be of any other contour. The flat faces possess the advantage of offering the least friction to the passage of fluids through the tubing and give a smooth outer surface. They are also of advantage when the tubing is to be used as a casing for flexible shafting, as there are no projecting surfaces to interfere with the rotary movement of the shafting within the tubing or the relative longitudinal movement between the shafting and tubing which may occur when the shafting is bent.

The tubing may be formed by any suitable machine adapted to wind the wires into coils coacting with each other as shown in the drawings, that is, with the edges 4 of each coil engaging the central portion of the channel 3 of the other coil and, when the tubing is straight, as in Fig. 1, with the edges also engaging those of adjoining turns of the same coil. In forming the tubing the coils will be wound to such relative diameters as to cause the oppositely acting spring tension of the wires to hold the coils firmly together with sufficient pressure to serve the purpose for which the tubing is to be used. The amount of pressure between the windings may be altered by altering the relative diameters to which the coils are wound.

The wires will ordinarily be wound in a lubricant or the latter will be freely applied to them during the winding operation. In such cases lubricant will be trapped in the spaces or pockets 7 between the coils, which will be an advantage as it will form a packing and also continuously lubricate the edges 4 at their lines of contact with the channels 3 as the tubing is bent. Bending of the tubing will tend to wear away any irregularities in the rounded edges and thereby produce a tighter contact between them and the channels 3 in which they move. If in time the lubricant in these pockets becomes gummy it will still act as a packing to reinforce the tight joints between the coils in preventing leakage of fluid from the tubing. In some cases it may even be desirable to fill the pockets during the winding operation with some plastic, fibrous, soft metallic or other suitable substance to serve as a packing 11 as shown in Fig. 6, although ordinarily the pressure between the coacting parts of the coils will be sufficient to prevent leakage from the tubing.

When the tubing is bent, as shown in Fig. 2, there will be a slight separation of the turns of the coils increasing in magnitude from the concave to the convex side of the bend. At the same time the edges 4 of the turns will be displaced a corresponding amount from their normal positions at the centers of the channels, and this displacement along the curved faces of the channels will increase the tightness with which the coils bind each other so as to compensate for the separation of the edges, in maintaining fluid-tight joints throughout the bent portion of the tubing. In order to permit bending, the sides 5 are bevelled sufficiently to permit the turns to move with respect to each other to allow for the sharpest bend which may safely be put into the tubing.

On account of the interlocked relation of the coils and the pressure with which they are held in contact with each other, there is no danger of the tubing uncoiling, and therefore holding members for the ends of the tubing are not required, except for the purpose of attaching the same to other objects.

The two-coil tubing shown in Figs. 1 and 2 is the simplest form of the invention and is sufficient for most purposes, but in case greater strength and tightness are required additional coils may be provided. Such a modification of the invention is shown in Fig. 4 in which 1 and 2 are inner and outer coils like the correspondingly numbered coils of Figs. 1 and 2 but instead of coacting with each other, as in those figures, their edges 4 engage channels 3 on opposite faces of a third coil 8 interposed between the coils 1 and 2. The channels 3 of the coil 8 are of the same contour as those of coils 1 and 2 and bear the same relation to the edges of the channels of those coils as described in connection with Figs. 1 and 2. In other words, the intermediate coil may be regarded as an outer coil with respect to inner coil 1 and as an inner coil with respect to outer coil 2.

As shown in Fig. 4, the wire of which the coil 8 is formed is of slightly less width than is the wire used for coils 1 and 2, so that when the coils are wound together there will be a slight separation, as at 9, between the turns of coil 8 to allow for the relative movement between the turns which occurs when the tubing is bent.

When this action takes place there will be a separation of the turns of the coils similar to that which occurs in the case of the two coils of Figs. 1 and 2, the engaging edges 4 of coils 1 and 2 moving apart and passing along the curved faces of the channels of coil 8 thus binding the coils tighter together. At the same time the edges of the channels of this coil will pass along the curved faces of the channels of the other coils as the turns of coil 8 are separated by the bending operation. Due to the strength of the additional coil and the increase in the number of contacting edges and faces between the interior and exterior of the tubing, the latter is particularly adapted for use in cases where fluids under high pressure are to be conveyed, as in the case of hydraulic and pneumatic tools and the like. As described in connection with Figs. 1 and 2, the pockets between coil 8 and the inner and outer coils may be filled with lubricant when the tubing is formed or other suitable packing material may be used if desired.

While a modification of the invention in which a single intermediate coil is used has been shown, it will be understood that the number of such coils may be increased as desired, each of them being like the one shown and coacting with each other and the inner and outer coils 1 and 2 in the same manner as described in connection with coil 8. By using coils of the cross-sectional shape shown in Fig. 3 for the innermost and outermost coils of tubing having intermediate coils, the tubing will have smooth interior and exterior surfaces, with their attendant advantages.

In the modifications of the invention described above the engagement of the edges of each coil with the curved face of the channel of another coil serves to lock the coils firmly together to prevent their turns from opening under longitudinal strain, for any tendency of the turns to separate will be opposed by the tendency of the edges 4 to pass onto higher points of the curved channel 3 with which they are in engagement, thus resisting the longitudinal force tending to separate the turns and also preventing leakage from the tubing.

In some cases it may be desirable to provide for a slight amount of lengthwise yielding of the tubing upon longitudinal strains, in the manner of a spring. For this purpose the central portions of the channels of the coils may be straight as shown at 10 in Fig. 5 bounded on each side by curved portions 3, onto which the edges 4 pass when the tubing is subjected to longitudinal strain sufficient to draw them off of the portions 10 with which they are normally in engagement. When the strain on the tubing is relieved the spring action of the coils will restore them to their normal position with their edges 4 in contact as shown in Fig. 5.

While this modification of the invention has been shown in connection with tubing composed of two coils, it may be used in connection with tubing having intermediate coils by forming the latter with cylindrical portions at the centers of their channels to permit the edges of the coacting coils to pass over them in the manner described with respect to Fig. 5.

While certain preferred embodiments of the invention have been shown and described it will be understood that various changes in its structural details may be made without departing from the principle of the invention as defined in the appended claims.

I claim:

1. Flexible tubing composed of a plurality of coils provided in their opposed faces with channels of arcuate cross section having edges of tapering cross section, said coils being so related that the edges of the channel of each turn of each coil lie in contact with the edges of the channel of contiguous turns of the same coil and also in contact with the central portion of the channel of two adjacent turns of an adjoining coil.

2. Flexible tubing composed of an inner coil provided with a channel in its outer face, an outer coil provided with a channel in its inner face and an intermediate coil provided with channels in both interior and exterior faces, said coils being so related that the edges of the channel of each turn of each coil lie in contact with the central portion of the channel of two adjacent turns of an adjoining coil.

3. Flexible tubing composed of an inner coil, an intermediate coil and an outer coil, each provided with a channel in the face opposed to an adjoining coil and each coil having the edges of each of its turns in engagement with the channel of two adjacent turns of an adjoining coil.

4. Flexible tubing composed of an inner coil, an intermediate coil and an outer coil, each provided with a channel in the face opposed to an adjoining coil and each coil having the edges of each of its turns in engagement with the channel of two adjacent turns of an adjoining coil and the inner and outer coils each having the edges of each of their turns in engagement with the edges of contiguous turns of the same coil.

5. Flexible tubing composed of a plurality of coils one at least of which has a flat face and bevelled side faces and all of which are provided in their opposed faces with channels having arcuate portions and having the edges of the channel of each turn of each coil lying in contact with the central portion of the channel of two adjacent turns of an adjoining coil and in engagement with the edges of contiguous turns of the same coil when the tubing is not flexed, said edges passing along the arcuate portions of the channels when the tubing is flexed to bind the coils more tightly together to make up for the separation of the contiguous edges of the turns of the coils.

In testimony whereof I affix my signature.

HERBERT COOPER.